DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1212

T892,014

METHOD FOR THE PREPARATION OF IMPACT POLYSTYRENES

Ervin E. Schroeder, Akron, and William J. Kern, Barberton, Ohio, assignors to The Firestone Tire & Rubber Company, Akron, Ohio

Continuation of application Ser. No. 747,831, July 26, 1968, which is a continuation-in-part of application Ser. No. 661,217, Aug. 17, 1967. This application Jan. 11, 1971, Ser. No. 105,655

Int. Cl. C08f *15/04*

U.S. Cl. 260—880 R

No Drawing. 15 Pages Specification

The production of modified polystyrenes of high impact strength is improved by polymerizing styrene containing a rubbery modifier dissolved therein, which styrene solution has a surprisingly low viscosity. These modifiers are branched rubbery lithium-catalyzed polymers derived from (1) stereolinear homopolymers of butadiene and (2) stereolinear copolymers of (a) butadiene and isoprene and (b) styrene, by treatment with a joining agent. They are substantially gel free. The butadiene homopolymers and the diolefin portions of the copolymers contain less than 12% vinyl structure (1,2-structure as to the polybutadiene or the butadiene portion; and 1,2-structure and 3,4-structure as to any isoprene portion). The molecular weight distribution of the polymers is increased by the joining action.